United States Patent
Fukuda et al.

(10) Patent No.: US 7,987,481 B2
(45) Date of Patent: Jul. 26, 2011

(54) RECEIVING APPARATUS AND RECEIVING METHOD

(75) Inventors: Tetsu Fukuda, Kanagawa (JP); Katsuhiro Miyamoto, Kanagawa (JP); Shuntaro Aratani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 195 days.

(21) Appl. No.: 11/866,833

(22) Filed: Oct. 3, 2007

(65) Prior Publication Data

US 2009/0007174 A1    Jan. 1, 2009

Related U.S. Application Data

(63) Continuation of application No. 10/660,674, filed on Sep. 12, 2003, now abandoned.

(30) Foreign Application Priority Data

Oct. 8, 2002 (JP) ................................ 2002-294745

(51) Int. Cl.
*G06F 3/00* (2006.01)
*G06F 13/00* (2006.01)
*H04N 5/445* (2011.01)

(52) U.S. Cl. ................. 725/39; 725/38; 725/47
(58) Field of Classification Search .................. 725/58
See application file for complete search history.

(56) References Cited

U.S. PATENT DOCUMENTS

| | | | |
|---|---|---|---|
| 5,452,012 A * | 9/1995 | Saitoh | 725/56 |
| 2002/0016964 A1 | 2/2002 | Aratani | |
| 2002/0051083 A1 | 5/2002 | Aratani | |
| 2003/0066086 A1* | 4/2003 | Tanaka et al. | 725/105 |
| 2004/0025179 A1* | 2/2004 | Russ et al. | 725/46 |
| 2004/0064835 A1* | 4/2004 | Bellwood et al. | 725/87 |
| 2004/0068739 A1 | 4/2004 | Russ | |
| 2004/0107449 A1 | 6/2004 | Fukuda | |
| 2005/0172332 A1 | 8/2005 | Fukuda | |
| 2008/0184313 A1* | 7/2008 | Knudson et al. | 725/58 |
| 2009/0199249 A1* | 8/2009 | Rodriguez et al. | 725/91 |

FOREIGN PATENT DOCUMENTS

JP    2001-359073    12/2001

OTHER PUBLICATIONS

U.S. Appl. No. 09/579,532, filed May 26, 2000.

* cited by examiner

*Primary Examiner* — William Trost, IV
*Assistant Examiner* — Omar Parra
(74) *Attorney, Agent, or Firm* — Fitzpatrick, Cella, Harper & Scinto

(57) ABSTRACT

A receiving apparatus according to the present invention includes a receiving unit for receiving television broadcasts and a communication unit for receiving streaming broadcasts via a network. A guide information producing unit produces guide information for displaying a program guide for television broadcast programs and a program guide for streaming broadcast programs on the same screen. An outputting unit outputs to a display device image data on the television broadcasts, image data on the streaming broadcasts, and the guide information.

4 Claims, 17 Drawing Sheets

FIG. 4

| GUI SOFTWARE a | | | | | | | | | |
|---|---|---|---|---|---|---|---|---|---|
| TUNING CONTROL | DeMux CONTROL | STREAM PROCESSING | OPERATION INPUT CONTROL | 1394 I/F CONTROL | SCREEN FORMING CONTROL | COMMUNICATION CONTROL | EPG APPLICATION | STREAMING INFORMATION CONTROL | STREAMING DECODER |
| b | c | d | e | f | g | h | i | j | k |

FIG. 10

| URL |
|---|
| NAME OF PROVIDING SITE |
| NAME OF CONTENT |
| BROADCAST START TIME |
| BROADCAST DURATION |
| CATEGORY |
| DESCRIPTION OF PROGRAM |
| ACCOUNTING MODE INFORMATION |
| PREVIEW IMAGE |
| SITE DEPENDENT INFORMATION |

FIG. 12

| MEDIA ID | |
|---|---|
| SERVICE ID | |
| EVENT ID | |
| PERSON NAME DESCRIPTOR | Num of contents |
| | size |
| | text information |
| | ⋮ |

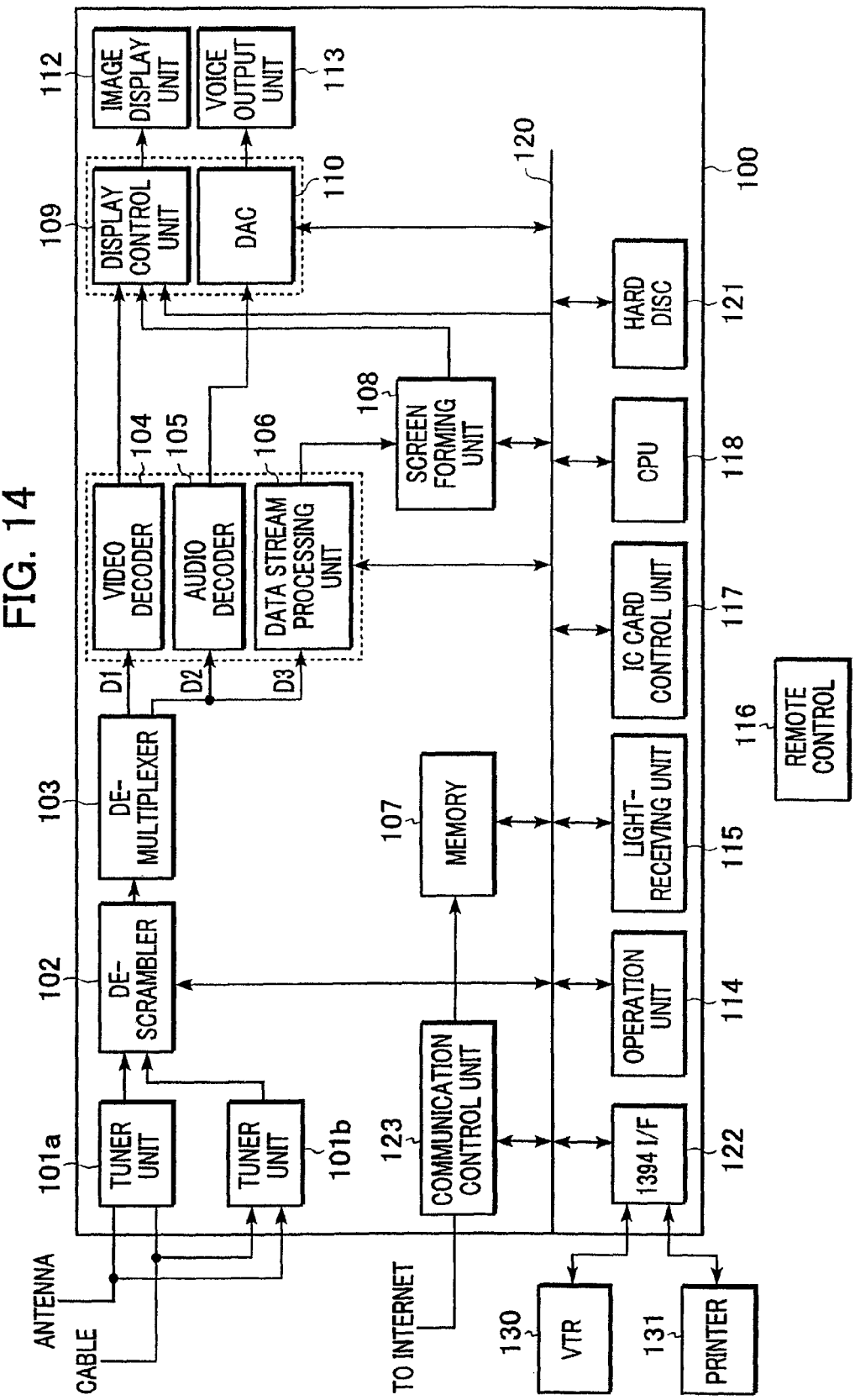

RECEIVING APPARATUS AND RECEIVING METHOD

This application is a continuation of application Ser. No. 10/660,674, filed on Sep. 12, 2003 now abandoned.

BACKGROUND OF THE INVENTION

1. Field of the Invention

The present invention relates to receiving apparatuses and receiving methods, and more particularly to an apparatus capable of receiving television broadcasts and streaming broadcasts.

2. Description of the Related Art

Recently, due to improvements in network technology such as asymmetric digital subscriber lines (ADSL), high-speed internet-access services, that is, broadband, are rapidly becoming commonplace. Broadband technology allows sufficient transfer rate for video signals of an image quality suitable for television broadcasting or for video tape recorders (VTRs) that were previously difficult to transfer in real time.

Streaming broadcasting is one of the services utilizing such broadband technology. Streaming refers to technologies for sequentially playing image and voice data in a server while downloading them via a network. The use of streaming technology allows moving image data with a large file size to be played without waiting for them to download. Also, streaming technology enables real-time distribution of moving images captured by a user. Using streaming technology in a broadband environment allows users to enjoy high-quality content through a personal computer (hereinafter, referred to as a PC).

As broadband becomes commonplace, users search for content that suits their tastes from among a vast amount of content available on the Internet and enjoy streaming broadcasts. Currently, such content searching is generally performed by using a search engine or a portal site for streaming broadcasting.

At present, streaming content is available in various formats. There are standard formats such as MPEG-1 Audio Layer 3 (MP3) and WAV. Also, there are independent formats for respective decoders typified by Windows (R) Media Player, RealVideo, and QuickTime, and such formats may depend on the decoder version. Moreover, there are various other decoders and corresponding formats, such as HotMedia, FreeVOD, and SoftwareVision. The users, where necessary, download such decoders or upgrade the version of such decoders, and in some cases, the users must perform an operation such as resetting various functions or restarting the PC. A system for receiving streaming content of this type is disclosed in Japanese Unexamined Patent Application Publication No. 2001-359073.

There are now demands for static images or the like obtained via the Internet or electronic mail or by a digital still camera to be viewed on a television screen in much the same way as television broadcasts are viewed. In light of the above background, the present inventor(s) came up with an idea of incorporating streaming broadcasting as a function of a television receiver. Accordingly, even users who are not good at operating PCs can enjoy streaming broadcasts through a television receiver.

However, in a case where television receivers are provided with such a function to receive streaming broadcasts, there is a possible problem of switching between media. In order to switch from television broadcasting to the Internet or from the Internet to static image display, there may be a procedure, such as operating keys on a remote control or tracking the hierarchical structure via a menu. If such operations are applied to a case where streaming broadcasts are viewed through a television receiver, the users must perform such troublesome operations every time the users switch between television broadcasting and streaming broadcasting. There may be needs of users to select and browse a program without being aware of the difference in media, such as television broadcasting and streaming broadcasting.

As described above, streaming broadcast content is widely available on the Internet.

At present, the user uses a portal site or a search engine as means for searching for content that suits the user's taste from among the available content.

When using such search means, however, the user must spend a very long time for searching. Moreover, the search results may not meet the user's needs. Furthermore, content found by searching may be in a format unsuitable for the users decoder. In this case, the user cannot view the content.

For television broadcasting, even with the increased number of programs due to digitalization, service information (SI) or the like included in television broadcast data provides a selection environment such as an electronic program guide (EPG). The use of the EPG allows desired content to be selected relatively easily from among a lot of content. Also, by an additional function such as category searching, many EPGs assist the users to perform a selection operation.

In contrast, streaming broadcasting is not provided with information such as SI. Thus, in streaming broadcasting, content cannot be selected using an EPG as in the television broadcasting.

Moreover, there is a problem in that various formats are used for receiving streaming broadcasts. Users who are inexperienced in operating the apparatus may be troubled by complicated downloading and various setting operations.

A function to view streaming broadcasts and a user interface are unnecessary for users who cannot view streaming broadcasts due to the absence of an environment for viewing streaming broadcasts and for users who do not desire to view streaming broadcasts even with the presence of an environment for viewing streaming broadcasts. Moreover, such function and user interface may cause confusion.

SUMMARY OF THE INVENTION

It is an object of the present invention to provide a receiving apparatus with an easy operation, and a receiving method therefor.

It is another object of the present invention to provide a receiving apparatus and a receiving method capable of easily selecting desired broadcast content when streaming broadcast content, television broadcast content, or other content is received and displayed.

According to an aspect of the present invention, a receiving apparatus includes a receiving unit for receiving broadcast content; a guide information producing unit for producing guide information on the broadcast content and for outputting the guide information to a display device; a relevant information acquisition unit for acquiring, via a network, relevant information on an operation for receiving the broadcast content by the receiving unit; and a control unit for controlling the guide information producing unit so as to change a display mode of the guide information in accordance with the relevant information acquired by the relevant information acquisition unit.

For example, the relevant information may be information required for receiving a predetermined type of broadcast content from among a plurality of types of broadcast content. The control unit may control the guide information producing unit so as to display guide information on the predetermined type of broadcast content.

The relevant information may be, for example, a software module for receiving the predetermined type of broadcast content.

The plurality of types of broadcast content may, for example, be distributed from respective types of media.

More specifically, the plurality of types of broadcast content may include television broadcast content that is distributed via television broadcast waves and streaming broadcast content that is distributed via the network. Also, the receiving unit may, for example, include at least one tuner for receiving the television broadcast waves and a communication connection unit for connecting to the network.

The control unit may detect the type of broadcast content that is receivable by the receiving unit on the basis of the relevant information. Also, the control unit may control the guide information producing unit so as to change the display mode of the guide information in accordance with the detected results.

According to another aspect of the present invention, a receiving apparatus includes a receiving unit for receiving broadcast content; a relevant information acquisition unit for acquiring, via a network, relevant information on an operation for selecting the broadcast content by the receiving unit; and a control unit for changing a function of the operation for receiving the broadcast content performed by the receiving unit in accordance with the relevant information acquired by the relevant information acquisition unit.

The control unit may change search functions for a plurality of the broadcast content in accordance with the relevant information.

The control unit may change a reservation function for receiving the broadcast content in accordance with the relevant information.

The receiving apparatus may further include a selecting unit for selecting desired relevant information from among a plurality of the relevant information. The relevant information acquisition unit acquires relevant information selected by the selecting unit.

According to another aspect of the present invention, a receiving apparatus includes a receiving unit for receiving television broadcasts; a communication unit for receiving streaming broadcasts via a network; a guide information producing unit for producing guide information for displaying a program guide for television broadcast programs and a program guide for streaming broadcast programs on the same screen; and an outputting unit for outputting to a display device image data on the television broadcasts, image data on the streaming broadcasts, and the guide information.

The receiving apparatus may further include a selecting unit for selecting a desired program using the guide information displayed on the display device; and a control unit for controlling the receiving unit, the communication unit, and the outputting unit so as to output image data on a program selected by the selecting unit to the display device.

The guide information producing unit may produce guide information for displaying the television broadcast programs and the streaming broadcast programs in the same format in one program list.

The receiving apparatus may further include a selecting unit for selecting a desired program by moving a cursor image for selecting a display area from among a plurality of program display areas in the program list between display areas of the television broadcast programs and display areas of the streaming broadcast programs.

According to another aspect of the present invention, a method for receiving broadcast content includes a guide information producing step of producing guide information on the broadcast content and of outputting the guide information to a display device; a relevant information acquiring step of acquiring, via a network, relevant information on an operation for receiving the broadcast content by a receiving unit; and a controlling step of controlling a guide information producing unit so as to change a display mode of the guide information in accordance with relevant information acquired by a relevant information acquiring unit.

According to another aspect of the present invention, a method for receiving broadcast content includes a relevant information acquiring step of acquiring, via a network, relevant information on an operation for selecting the broadcast content; and a controlling step of changing a function of the operation for receiving the broadcast content in accordance with the relevant information acquired in the relevant information acquiring step.

According to another aspect of the present invention, a method for receiving television broadcasts by a receiving unit and for receiving streaming broadcasts by a communication unit via a network includes a guide information producing step of producing guide information for displaying a program guide for television broadcast programs and a program guide for streaming broadcast programs on the same screen; and an outputting step of outputting to a display device image data on the television broadcasts, image data on the streaming broadcasts, and the guide information.

Further objects, features and advantages of the present invention will become apparent from the following description of the preferred embodiments (with reference to the attached drawings).

BRIEF DESCRIPTION OF THE DRAWINGS

FIG. 4 shows the structure of CPU software.

FIG. 10 shows an example of a list of streaming content information.

FIG. 12 shows person name information, which is an additional SI module.

FIG. 14 is a block diagram showing the structure of a receiving apparatus according to a third embodiment of the present invention.

DESCRIPTION OF THE PREFERRED EMBODIMENTS

First Embodiment

Figure 1:
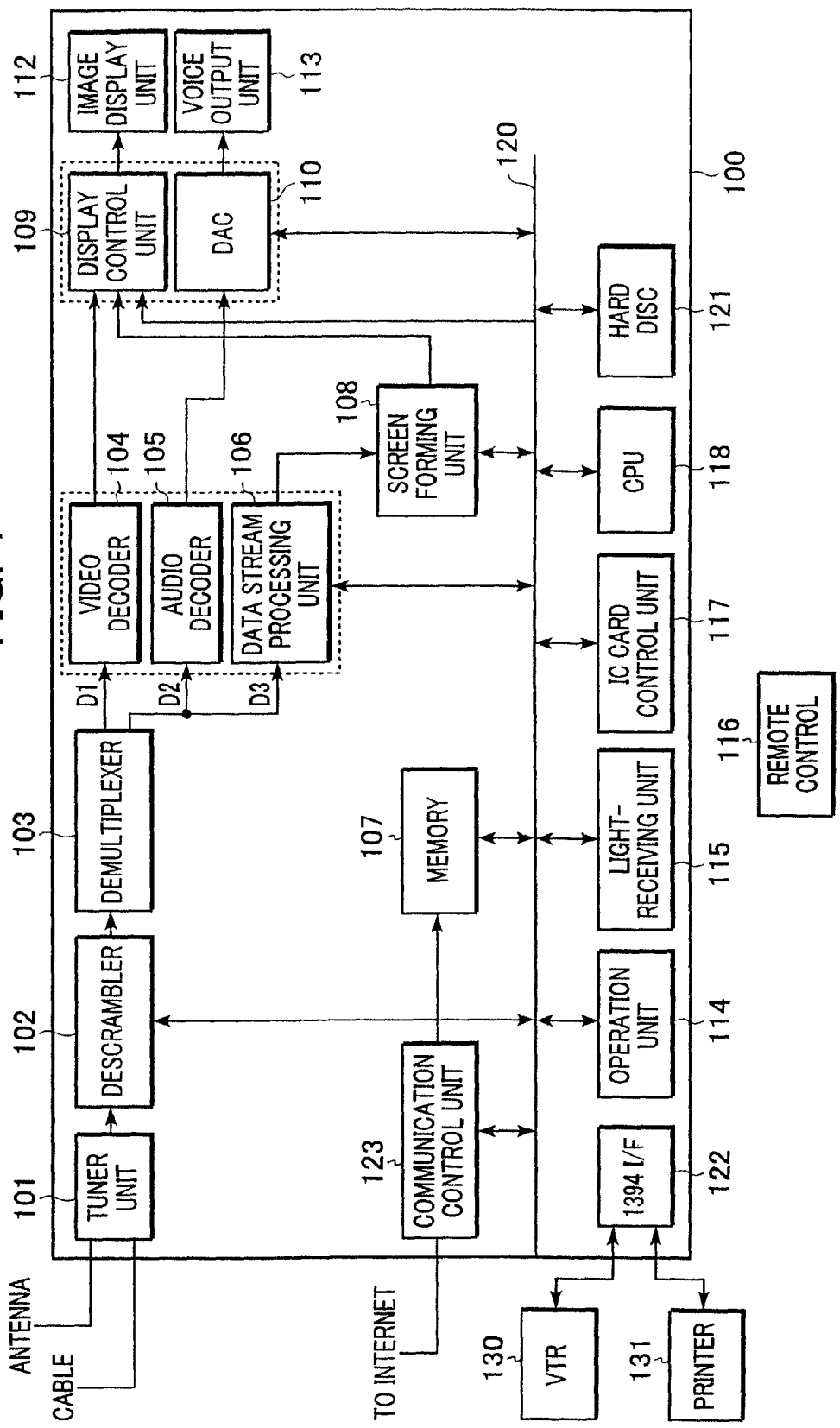
FIG. 1 is a block diagram showing the structure of a receiving apparatus according to a first embodiment of the present invention.

A first embodiment of the present invention will be described with reference to the drawings. FIG. 1 shows the structure of a digital television receiver 100 to which the present invention is applicable.

Referring to FIG. 1, a signal received at an antenna (not shown) is input to a tuner unit 101. The tuner unit 101 performs processing on the input signal, such as demodulation and error correction, and produces digital data in a format called a transport stream. Then, the tuner unit 101 outputs the transport stream (TS) data to a descrambler 102. If the TS data received from the tuner unit 101 is scrambled for restricted viewing, the descrambler 102 descrambles the TS data in accordance with descrambling key information included in the TS data and with key information output from an IC card control unit 117, and then outputs the descrambled TS data to a demultiplexer 103.

The IC card control unit 117 is an IC card reader/writer in which an IC card is removably provided. The IC card stores the users contract information and the key information used for descrambling the descrambling key information included in the TS data. If key information used for descrambling the descrambling key information received from the descrambler 102 is included in the data in the IC card, the IC card control unit 117 outputs the key information to the descrambler 102. Predetermined descrambling may be performed by storing different key information in respective IC cards and exchanging the IC cards.

If the TS data received from the tuner unit 101 is not scrambled, the descrambler 102 directly outputs the TS data to the demultiplexer 103.

From among the TS data including different channels of image and voice data, electronic program guide (EPG) data, data broadcast data, and the like that are received from the descrambler 102 and are time-division multiplexed, the demultiplexer 103 retrieves image data D1 and voice data D2 on a program currently being broadcast on a channel selected by an operation unit 114 or a remote control 116. Then, the demultiplexer 103 outputs the image data D1 and the voice data D2 to a video decoder 104 and an audio decoder 105, respectively. The demultiplexer 103 also retrieves data broadcast and EPG data D3 from the TS data and inputs the data broadcast and EPG data D3 to a data stream processing unit 106. The data broadcast and EPG data D3 processed by the data stream processing unit 106 is captured into a memory 107 via a bus 120 connected to a CPU 118. After software processing, which will be described below, by the CPU 118, the data broadcast and EPG data D3 is stored on a hard disc 121.

The TS data is transferred in units of packets and the header of each packet contains a packet identification (PID). The demultiplexer 103 reads the PID in order to distinguish among the image data D1, the voice data D2, and the data broadcast and EPG data D3.

Figure 2:
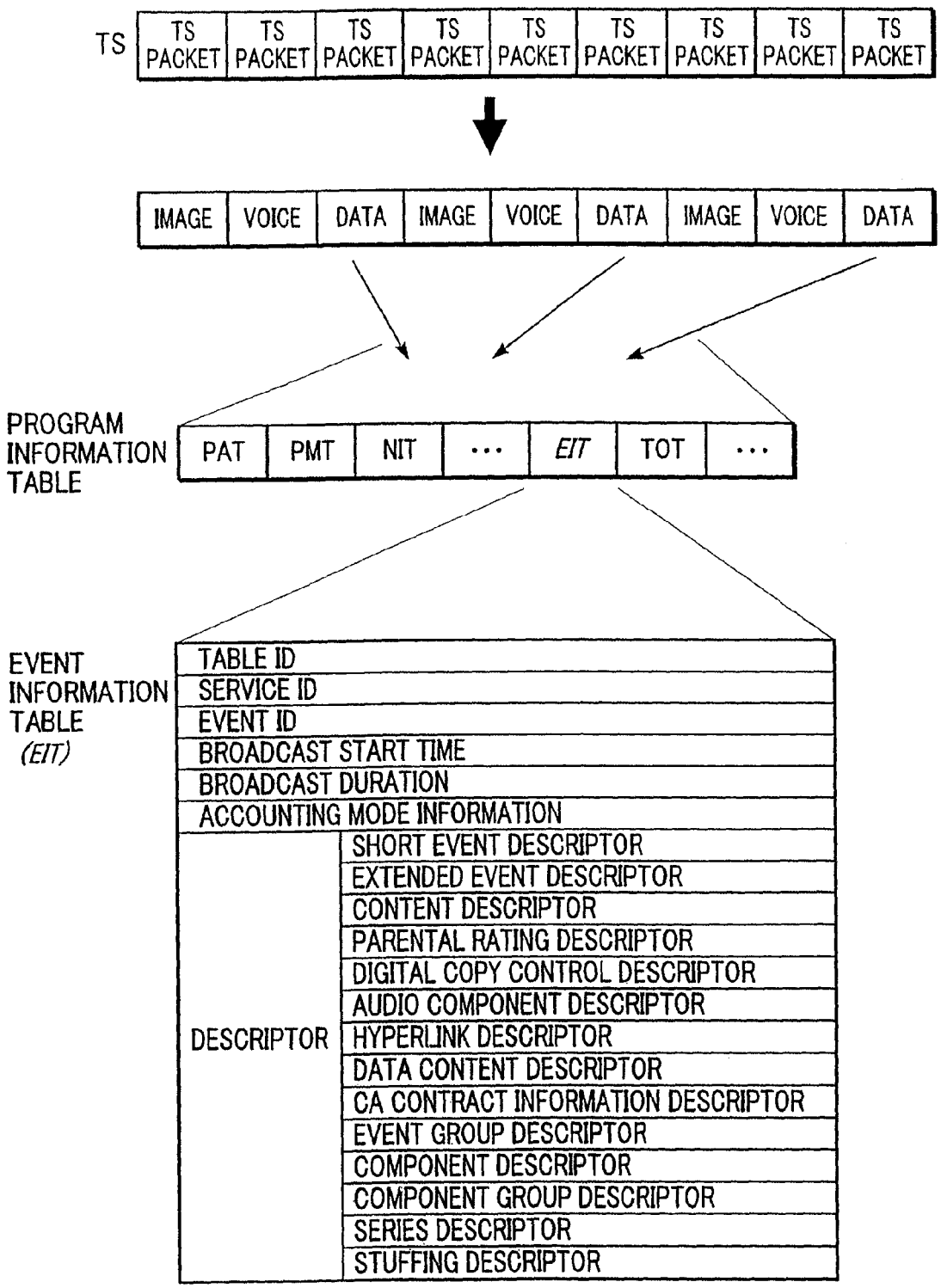
FIG. 2 shows the structure of TS data.

FIG. 2 shows the structure of a TS signal. The data broadcast and EPG data D3 includes various program information tables relating to information inherent in a broadcast program, such as a program association table (PAT), a program map table (PMT), a network information table (NIT), an event information table (EIT), and a time offset table (TOT). The data broadcast and EPG data D3 will be described below.

The image data D1 will now be described. The video decoder 104 expands the compressed data, for example, it performs Moving Picture Experts Group 2 (MPEG2) decoding on the image data D1 received from the demultiplexer 103, and outputs the decoded image data D1 to a display control unit 109. The display control unit 109 selects display or multiplexes the image data D1 in accordance with an operation of the operation unit 114 or the remote control 116, and displays the image data D1 on an image display unit 112. If a plurality of image data D1, voice data D2, and data broadcast and EPG data D3 is received, they are combined in the display control unit 109 and are output to the image display unit 112. A screen forming unit 108 will be described below. The image display unit 112 includes a monitor and an image signal input terminal (not shown).

The voice data D2 will now be described. The audio decoder 105 performs MPEG2 decoding on the voice data D2 received from the demultiplexer 103, and outputs the decoded voice data D2 to a digital to analog converter (DAC) 110. The DAC 110 converts the voice data D2 received from the audio decoder 105 to an analog signal and outputs it to a voice output unit 113. The voice output unit 113 includes a speaker and a voice signal input terminal (not shown).

The data broadcast and EPG data D3 will now be described. The EPG data is transferred through a data structure that is defined in the document entitled Program Arrangement Information Used in Digital Broadcasting and the like of a standard published by the Association of Radio Industries and Businesses (ARIB). Main configuration data includes a service description table (SDT) for transferring information on a programmed channel, such as a programmed channel name and a broadcaster name, a bouquet association table (BAT) for transferring information on a bouquet (a group of programmed channels), such as a bouquet name and a programmed channel included therein, an event information table (EIT) for transferring information on a program, such as a program name, a broadcast start date and time, a description of the contents, and a time data table (TDT) for transferring information on the current date and time.

FIG. 2 shows the structure of the data broadcast and EPG data D3. The EPG data used in this embodiment is written as some items and descriptors in the EIT. The EPG data is arranged in the form of a so-called EPG and is displayed by the data stream processing unit 106 and the screen forming unit 108. If streaming content information, which will be described below, is included, an EPG including the streaming content information added thereto is displayed. In a header section of the EIT, the start time and duration of the broadcast program as well as a table ID, a service ID, and an event ID are written. In the next section of the EIT, some descriptors are written. Among them, descriptors pertaining to this embodiment will be described.

A short event descriptor describes the title (80 bytes or less) and subtitle (160 bytes or less) of a program. An extended event descriptor describes names of the actors, the scriptwriter, the presenter, and the like, comments on the program, and the like. A content descriptor describes the category of the broadcast program. Categories include broad and narrow categories. The broad categories include news report, sports, drama, movie, variety, and education. The narrow categories are more detailed categories than the broad categories. For example, sports is divided into narrow categories, soccer, baseball, and Olympics. A parental rating descriptor describes an age not permitted for viewing and/or listening. A digital copy control descriptor describes restriction information on digital and analog copying. A data content descriptor describes information on data broadcasting relating to the program. A CA contract information descriptor describes information on whether or not the user is allowed to view or record the program to be charged for. An event group descriptor describes information on sharing and group formation of events and link information on event relay. A component descriptor describes information on a combination of components within an event on a multi-view TV. A series descriptor describes information on a series, rebroadcasting, and the like.

The operation of EPG display will now be described. When an operation to display the EPG is performed by the operation unit 114 or the remote control 116, an instruction to display the EPG from the operation unit 114 or an instruction to display the EPG received from a light-receiving unit 115 through the remote control 116 is input to the CPU 118. When the EPG display instruction is received from the operation unit 114 or the light-receiving unit 115, the CPU 118 reads necessary information from the memory 107 and outputs it to the data stream processing unit 106. The read information is program information on a channel selected in accordance with the operation of the operation unit 114 or the remote control 116. When an image screen is changed to an EPG screen in accordance with the EPG display instruction from the operation unit 114 or the remote control 116, the CPU 118 reads a channel that was displayed on the last EPG screen from the memory 107, and also reads information on a program being broadcast at a time corresponding to the current time from the memory 107.

As described above, the data broadcast and EPG data D3 includes data such as the SDT, the EIT, and the TDT. The data stream processing unit 106 reads the TDT to retrieve information on the current time and outputs the information on the current time to the CPU 118. The CPU 118 receives the information on the current time and determines a time for EPG display corresponding to the current time and outputs the appropriate time information to the data stream processing unit 106. Then, the data stream processing unit 106 reads the SDT from the memory 107 in accordance with the time information received from the CPU 118 in order to check the presence or absence of a program list and to obtain names of channels of the present and other streams, channel numbers, and the like. Moreover, the data stream processing unit 106 reads the EIT from the memory 107 to obtain information on titles of programs on channels of the present and other streams, starting times, categories, and descriptions of the programs. Then, the data stream processing unit 106 decodes the data broadcast and EPG data D3 read from the memory 107 and outputs the decoded EPG data to the screen forming unit 108.

The screen forming unit 108 outputs character signals for generating a normal EPG screen to the display control unit 109 in accordance with the EPG data received from the data stream processing unit 106.

The display control unit 109 outputs an image signal to the image display unit 112 in accordance with the operation of the operation unit 114 or the remote control 116, in such a manner that an image according to the image data output from the video decoder 104 or an EPG screen according to the character signals output from the screen forming unit 108 is selectively displayed. When the instruction to display the EPG screen is given by the operation unit 114 or the remote control 116, the display control unit 109 outputs to the image display unit 112 the character signals output from the screen forming unit 108.

The channel information displayed on the image display unit 112 is stored in the memory 107. Thus, the channel information can be read from the memory 107 and the EPG screen can be redisplayed as described above when the EPG screen is displayed the next time. If streaming content information is retrieved, an EPG including the streaming content information added thereto is displayed. The streaming information will be described below.

For data broadcasting, digital data is repeatedly sent from a broadcast station in accordance with a DSM-CC data carousel defined in ISO/IEC13818-6. The data broadcast data filtered by the demultiplexer 103 includes text information, script information, image information, and image and voice data. The text information is described in accordance with the extensible Markup Language (XML) defined by the World Wide Web Consortium (W3C).

In the data stream processing unit 106, the data broadcast and EPG data D3 is decoded into EPG data composed of text information and image information and data broadcast data composed of text information, image information, and image and voice data. Then, the decoded data is input to the memory 107 via the bus 120. After processing the data broadcast data, the CPU 118 stores the processed data, including XML data for display, on the hard disc 121.

When receiving an instruction to display data broadcasts from the operation unit 114 or the light-receiving unit 115, the CPU 118 reads the XML data for display from the hard disc 121 and outputs it to the screen forming unit 108.

The screen forming unit 108 outputs the image signal to the display control unit 109 in accordance with the data processed by and output from the CPU 118. The display control unit 109 outputs the image signal to the image display unit 112 so as to selectively display the image screen, the data broadcast screen, or the like or to display a composite screen, as described above.

An IEEE 1394 interface 122 is connected to the bus 120. The IEEE 1394 interface 122 is used for the digital television receiver 100 to perform protocol communication with a video tape recorder (VTR) 130 and a printer 131 that are externally connected to the digital television receiver 100.

Figure 3:
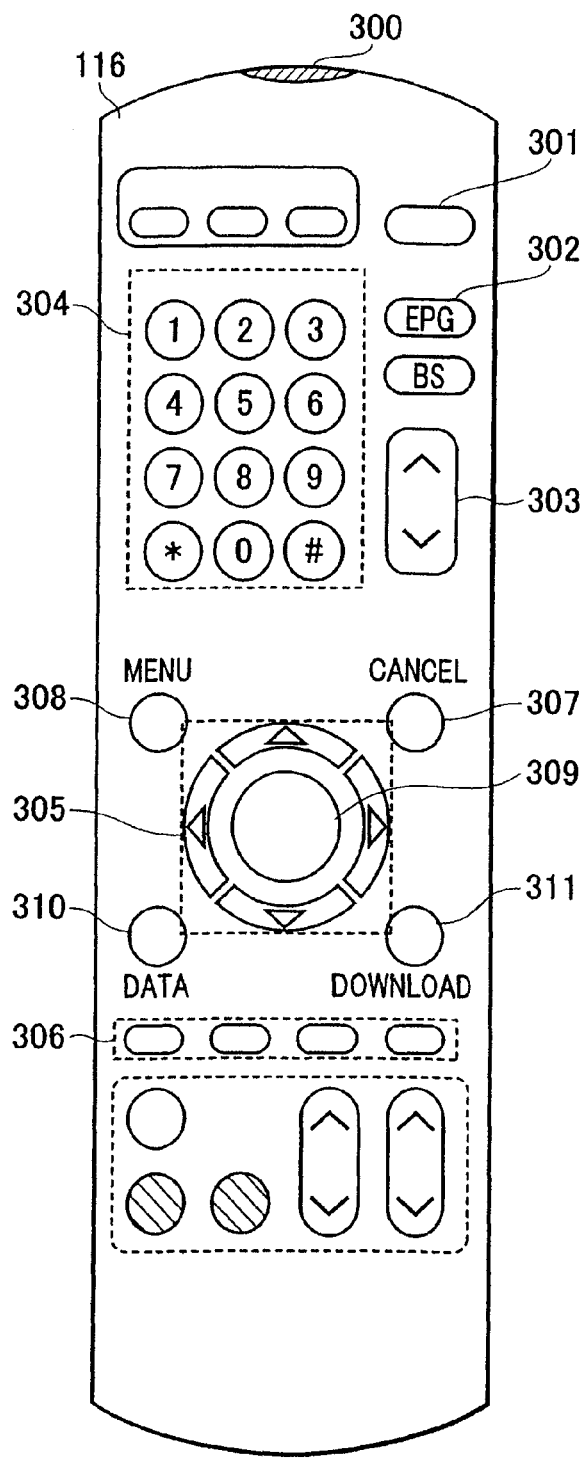
FIG. 3 shows a remote control.

FIG. 3 shows an example of the remote control 116. In FIG. 3, only keys for operating functions required for explaining this embodiment are shown. Thus, keys required for practical receivers are not limited to them.

Also, in addition to the remote control 116 shown in FIG. 3, a pointing device such as a mouse may be used.

Referring to FIG. 3, the remote control 116 includes a light-emitting unit 300 for infrared communication between the remote control 116 and the light-receiving unit 115 shown in FIG. 1, a power key 301 for switching on and off the power, an EPG display key 302 for instructing EPG display, a channel up/down key 303 for selecting channels in the tuned order, numeric keys 304 for channel selection, cursor keys 305 for moving a selection cursor in four directions (up, down, left, and right), a set key 309 for confirming the selection of an area designated by the selection cursor, and color keys 306 of the four colors blue, red, green, and yellow, which are arranged from left to right. The remote control 116 also includes a cancel key 307 for cancellation of a wrong key operation, a menu key 308 for displaying a menu screen, a data key 310 for displaying data broadcasts, and a download key 311 for displaying a downloadable module, described below. Other keys illustrated in FIG. 3 are used for various functions of the digital television receiver. Since, however, these keys are not used for the operations described in this embodiment, a detailed explanation for them is omitted here.

The CPU 118 includes a program execution unit. The CPU 118 controls the tuner unit 101, the descrambler 102, the demultiplexer 103, the video decoder 104, the audio decoder 105, the data stream processing unit 106, the screen forming unit 108, the display control unit 109, and the DAC 110 in accordance with the operation of the operation unit 114 or the remote control 116, including operation switches for channel selection, power on/off, and the like.

FIG. 4 shows the structure of control software executed by the CPU 118. Referring to FIG. 4, graphical user interface (GUI) software a is a core part of signal processing in this embodiment. Each piece of control software b to h functions as interface software (driver) for controlling the processing circuits shown in FIG. 1.

A feature of the present invention is that a module for decoding streaming broadcast data and a module for controlling data on streaming content description are dynamically incorporated through a communication control unit. A streaming information control module j and a streaming decoder k shown in FIG. 4 represent such downloaded modules. An EPG application i performs EPG display and reservation control. In this embodiment, as described below, display contents and the function of the EPG application i can be dynamically changed depending on the downloaded module.

Figure 5:
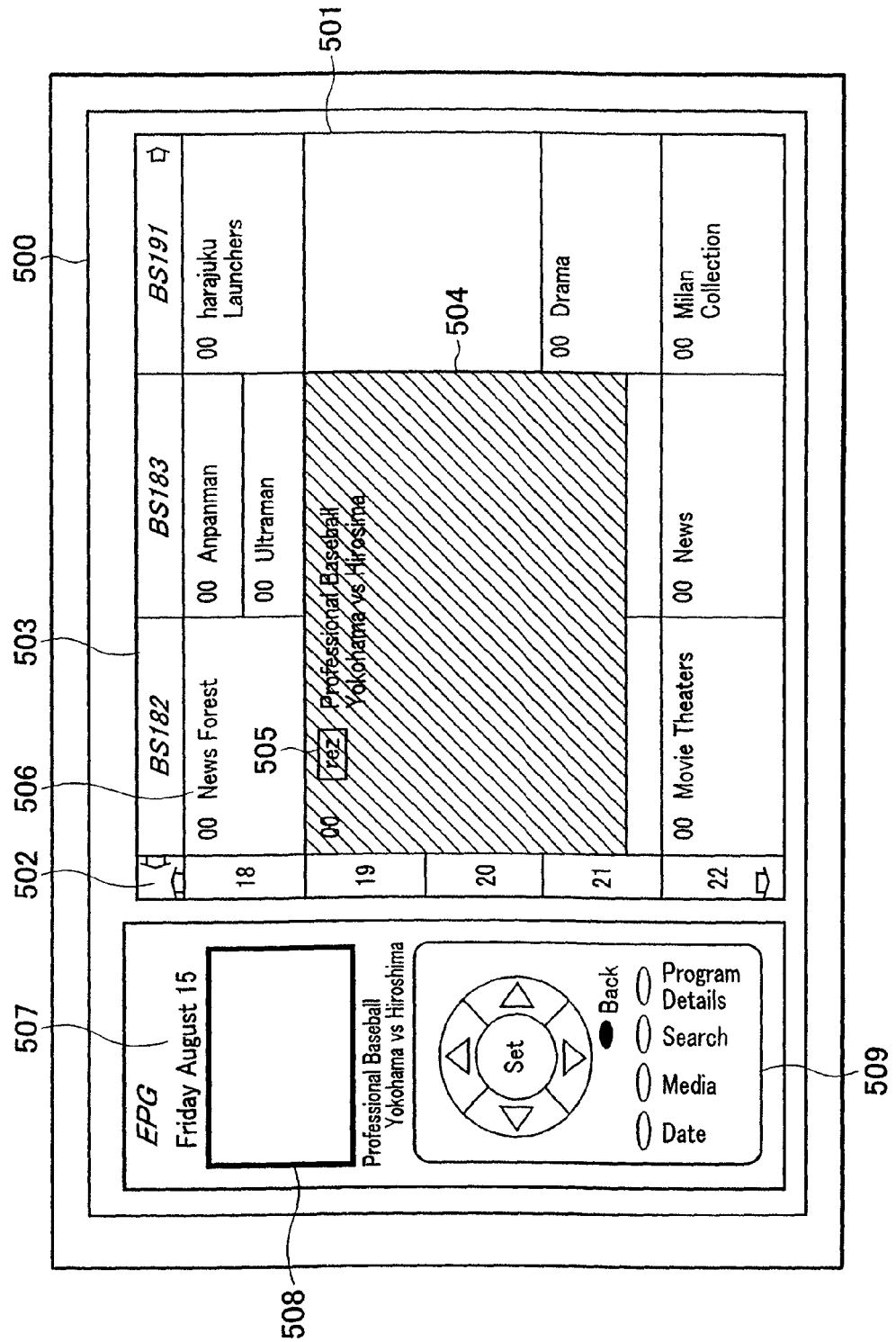
FIG. 5 shows an example of EPG display.

FIG. 5 shows an example of an EPG screen according to this embodiment. The EPG shown in FIG. 5 is in a state before downloading a module for receiving streaming broadcasts.

An EPG full screen 500 is shown in FIG. 5. Means for extracting the EPG data from the TS data and for displaying the extracted EPG data on the image display unit 112 is the same as in the description above. In a normal EPG screen 501, a longitudinal axis 502 represents a temporal axis covering five hours and a lateral axis 503 represents a channel axis covering three channels. Although programs on the three channels for five hours are displayed here, the number of displayed programs is not limited to this as long as the EPG data can be obtained.

Figure 6:
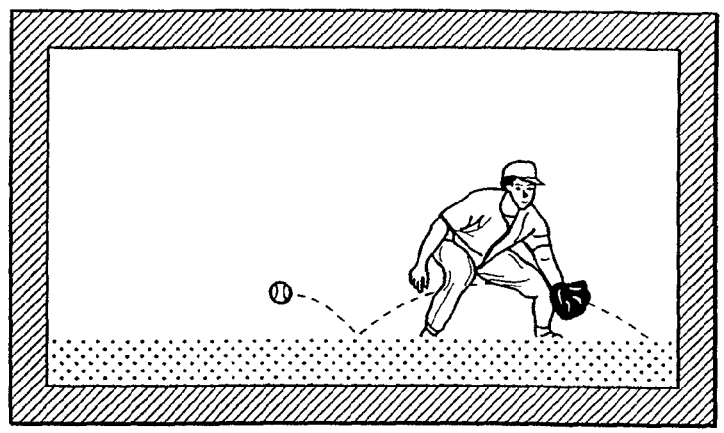
FIG. 6 shows full-screen display of a program being broadcast.

The user moves a focused area 504 displayed on the EPG screen 501 to a desired program using the cursor keys 305 of the remote control 116 for desired operations. The focused area 504 for channel selection can be moved only within the EPG screen 501. A program at a time and on a channel not displayed can be displayed by scrolling. If the user operates the set key 309 while focusing on a program that is currently being broadcast, the program can be viewed in the full-screen mode (shown in FIG. 6). If the user operates the set key 309 while focusing on a program that will be broadcast in the future, a viewing or recording reservation for the program can be made. If a viewing or recording reservation is made, a reservation confirmation icon 505 is displayed. The name and start time of each program are shown in a program name and start time display part 506. A date corresponding to the program list displayed in the EPG is displayed in a date display part 507. If the program highlighted by focusing is currently being broadcast, the program is displayed in a focused program display screen 508. If the program highlighted by focusing will be broadcast in the future, the program that is currently being broadcast by the same broadcast station that will broadcast the highlighted program in the future is displayed in the focused program display screen 508. An operation guide for indicating an operation procedure to the user is displayed in an operation guide display part 509.

A procedure for downloading an extension module will now be described. In this embodiment, a streaming broadcast viewing module is downloaded as an extension module.

Figure 7:
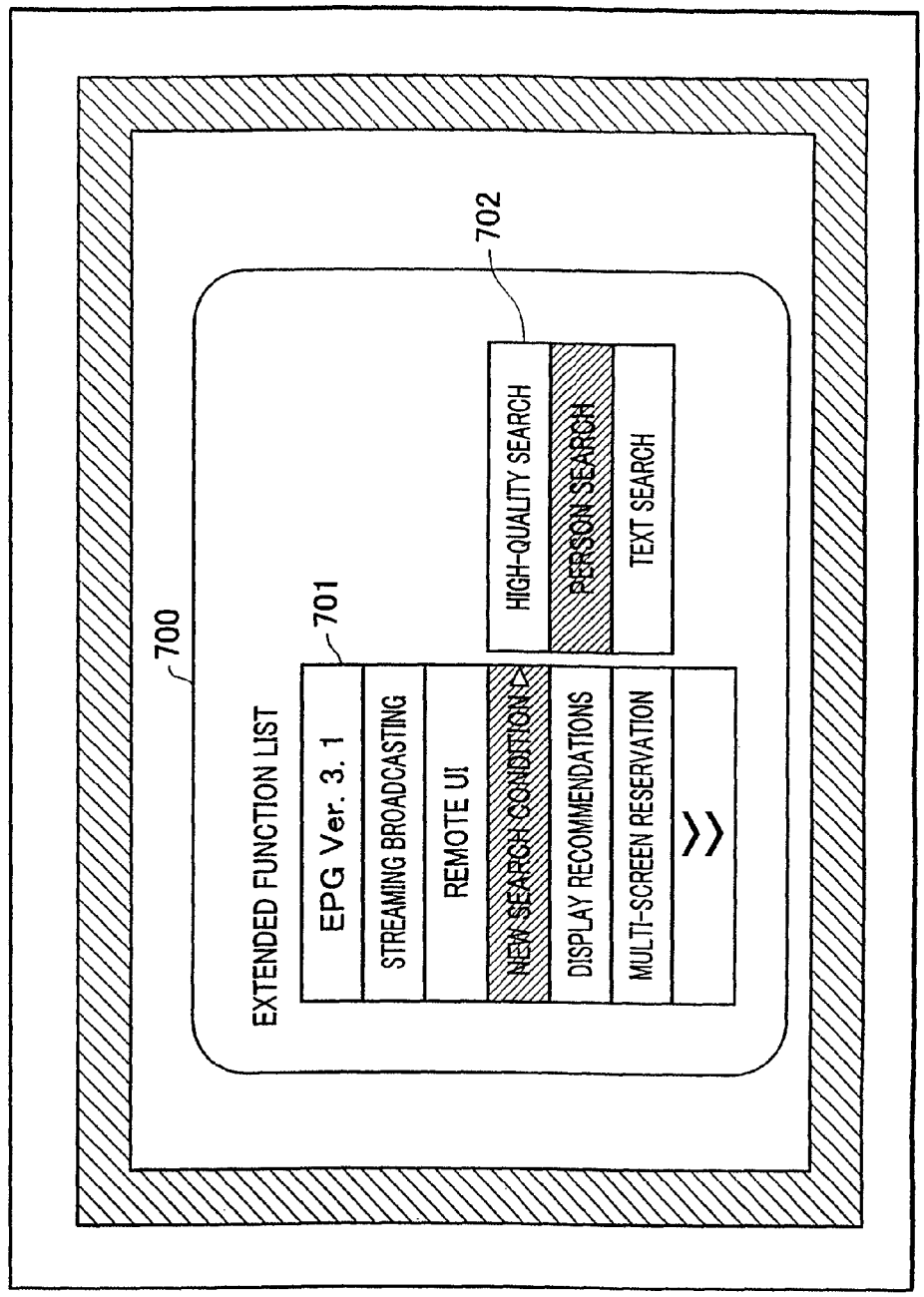
FIG. 7 shows an example of a list of downloadable additional modules.

Operation of the download key 311 of the remote control 116 by the user allows a download module list 700 shown in FIG. 7 to be displayed. The CPU 118 receives the input from the download key 311 and accesses a predetermined server on the Internet through a communication control unit 123 in order to retrieve a download table in which information for displaying the latest download module list is written. In this embodiment, it is assumed that the server is provided by a receiver manufacturer. The download table downloaded from the server is temporarily stored in the memory 107. The CPU 118 compares the module currently held and the download table temporarily stored in the memory 107 to determine whether or not a new module can be downloaded. Here, items such as the module version, date and time of module creation, file size, and the like are compared. Then, the CPU 118 displays the results to the user as a download module list.

In the download module list 700, only downloadable modules can be selected. The user focuses on a desired module using the cursor keys 305 of the remote control 116 and operates the set key 309 in order to download a new module (or to update an existing module). If a selected download module includes a submenu 702, the submenu 702 can be displayed by operating a right cursor key of the remote control 116 while focusing on a desired module in a main menu 701. The method for selecting the submenu 702 is the same as in the method for selecting the main menu 701.

The downloaded module is temporarily stored in the memory 107 through the communication control unit 123 and is then stored on the hard disc 121. Accordingly, the structure of the control software executed by the CPU 118 shown in FIG. 4 is arranged such that the streaming broadcast viewing module (the streaming information control module and the streaming decoder) is added as a new module. The communication control unit 123 uses a communication protocol, such as Transmission Control Protocol/Internet Protocol (TCP/IP), User Datagram Protocol (UDP), or Hyper Text Transfer Protocol (HTTP).

Figure 8:
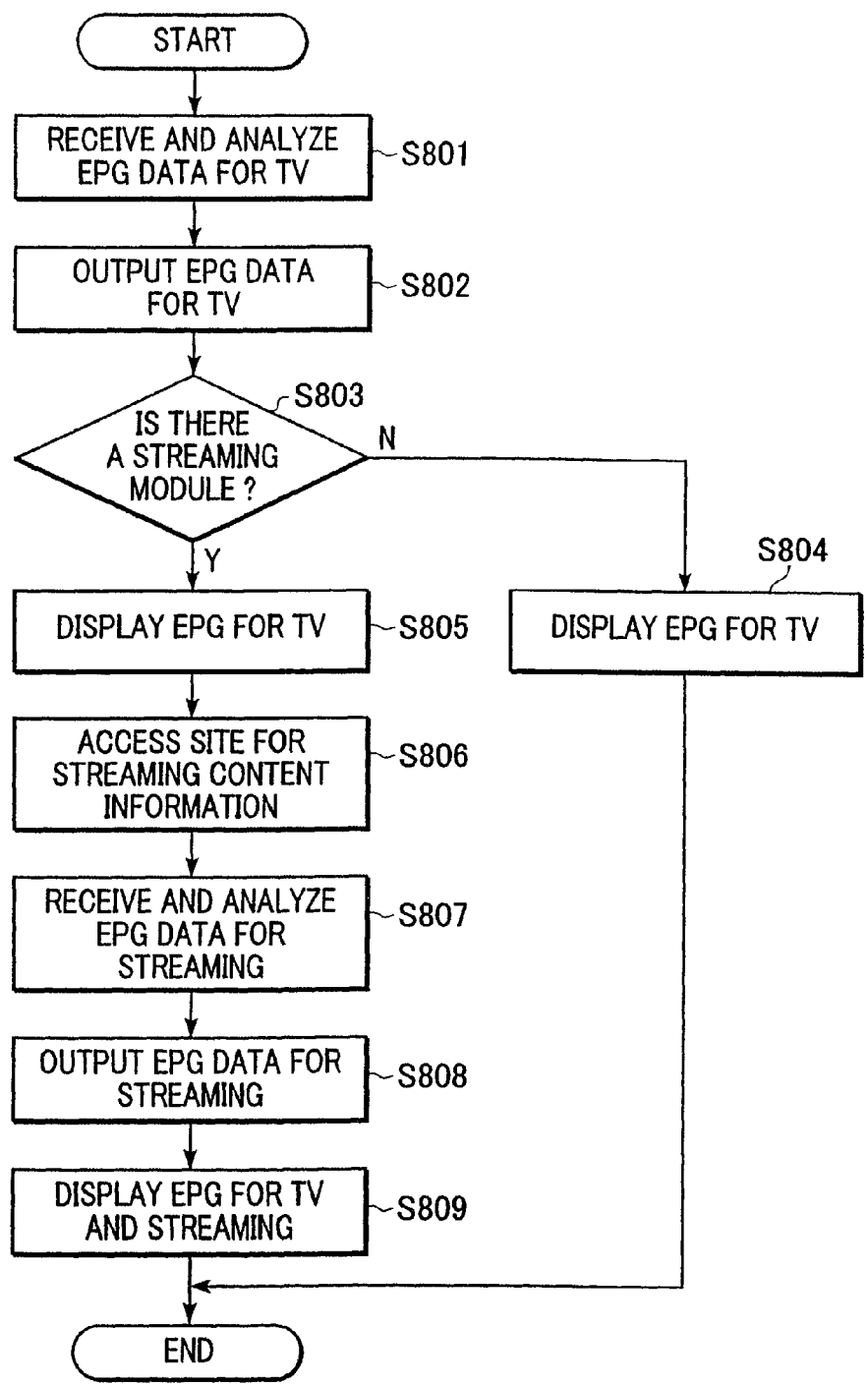
FIG. 8 is a flowchart of a process to display an EPG after adding a module.

FIG. 8 shows a flowchart of a process executed by the CPU 118 to display the EPG to the user. The user presses the EPG display key 302 of the remote control 116 to start the process. The CPU 118 receives the input from the EPG display key 302 and starts the EPG application i. The EPG application i retrieves EPG data from the TS data, as described above, and analyzes the EPG data (step S801). After the analysis, the EPG application i outputs character signals for generating a normal EPG screen for television broadcasts to the display control unit 109 through the screen forming unit 108 (step S802). Then, the EPG application i asks the memory 107 whether or not there is a streaming broadcast viewing module as a download module (step S803). If there is no streaming broadcast viewing module, only the EPG for television broadcasts shown in FIG. 5 is displayed (step S804).

In contrast, if there is a streaming broadcast viewing module, in other words, if streaming broadcasts can be viewed, the EPG for television broadcasts is displayed (step S805) and then the EPG application i accesses, through the communication control unit 123, a site for providing streaming content information (step S806) while the user browses or operates the EPG for television broadcasts. The EPG application i retrieves EPG data for streaming broadcasts from the site and analyzes the EPG data (step S807). After changing the format of the EPG data for streaming broadcasts to a format equal to that of the EPG data for television broadcasts, the EPG application i outputs the EPG data for streaming broadcasts to the screen forming unit 108. The screen forming unit 108 generates a display screen in such a manner that the received EPG data for streaming broadcasts is in the same format as that of the EPG for television broadcasts that is currently displayed, and prepares for the display (step S808). Then, in response to the users request, an integrated EPG screen for television broadcasts and streaming broadcasts is displayed (step S809).

Figure 9:
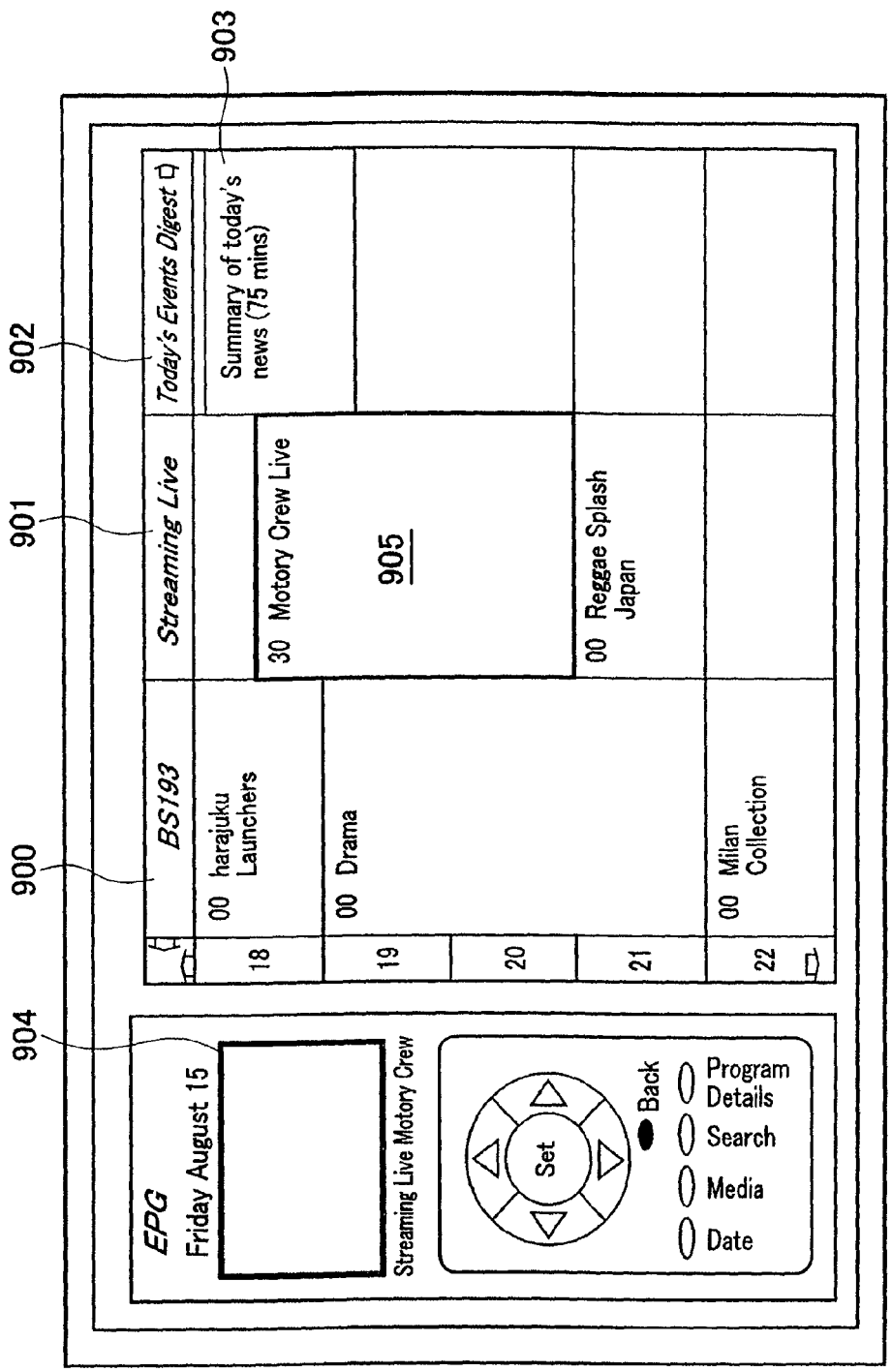
FIG. 9 shows an example of an integrated EPG screen.

Although various display modes of the integrated EPG screen for television and streaming broadcasts are possible, a mode shown in FIG. 9 is used in this embodiment.

The integrated EPG screen for television broadcasts and streaming broadcasts will be described with reference to FIG. 9. The EPG shown in FIG. 9 is an EPG for providing an environment for channel selection to the user without the user being aware of the difference in media, namely television and streaming. As soon as preparation for displaying the EPG for streaming broadcasts is completed, the integrated EPG screen including a broadcast frame for the EPG for streaming broadcasts added thereto is displayed instead of the EPG screen only for television broadcasts. Here, the longitudinal axis represents time and the lateral axis represents broadcast stations. Broadcast station information includes information on the television broadcast station and information on the streaming broadcast station and both types of information are displayed at the same time.

The user moves the focus to a desired program using the cursor keys 305 of the remote control 116, as in the operation of the normal EPG for television broadcasts. A program of a broadcast station not displayed can be displayed by moving the focus to the right or left edge and by moving further in the same direction in order to scroll the entire or a part of the screen. In order to seamlessly display a program guide for streaming broadcasts, the focus is moved to a television broadcast program guide for the last television broadcast station 900 and is then further moved in the same direction.

A live broadcast program guide 901 for a streaming broadcast station for live broadcasts is displayed in a format similar to that for television broadcasts. In an on-demand broadcast program guide 902 for a streaming broadcast station for on-demand broadcasts, the start time is determined by the user. Thus, the start time of an on-demand program 903 is always equal to the current time. Also, the end time is calculated by adding the broadcast duration to the current time, and the on-demand broadcast program guide 902 are displayed in the same format as the normal television broadcast program guide.

An operation for acquiring the EPG data for streaming will be described. The streaming control module (the EPG application i shown in FIG. 4) receives an acquisition request for the EPG data from the CPU 118 and accesses a predetermined uniform resource locater (URL) through the communication control unit 123. A Web server designated by the URL provides streaming content and information on the streaming content. In this embodiment, it is assumed that the Web server is provided by the receiver manufacturer. More particularly, the Web server is a site for providing a list for streaming content information, as shown in FIG. 10.

The information is written in the same format as that of information such as the SDT and the EIT that can be retrieved from the data broadcast and EPG data D3. If an appropriate broadcast start time is stored, it is determined to be a live broadcast. If an appropriate broadcast start time is not stored, it is determined to be an on-demand broadcast. The preview image shown in FIG. 10 represents static image data for displaying a streaming broadcast program 905 on a slave screen 904 in FIG. 9 when the streaming broadcast program 905 is focused on using the cursor keys 305 of the remote control 116 during the EPG operation.

Figure 11:
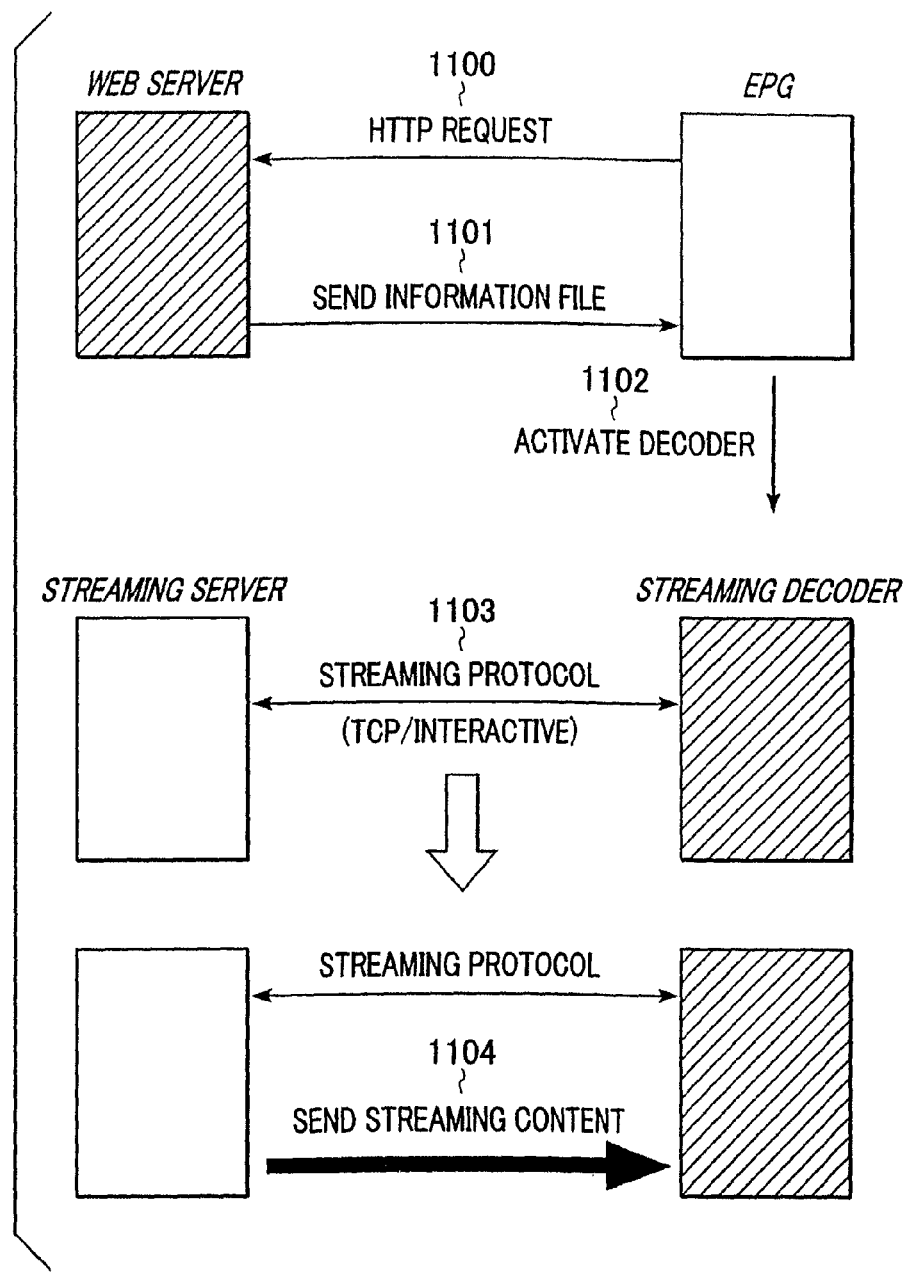
FIG. 11 is an illustration for explaining processing from requiring streaming data to receiving the streaming data.

Processing for receiving, decoding, and displaying streaming data used in this embodiment will now be described with reference to FIG. 11. When the user selects desired streaming content by operating the remote control 116, the EPG application retrieves a URL from streaming content information of a corresponding program. A request for an information file is given to a Web server designated by the URL (1100). The information file is sent to the EPG application from the requested Web server (1101). The location, protocol, and the like of the streaming server are written in the information file. The EPG application receives the information file and activates the streaming decoder to provide the information file to the streaming decoder (1102).

The streaming decoder establishes an interactive TCP connection with the streaming server on the basis of the received information file (1103). This allows control by a designated streaming protocol. The streaming server establishes a one-way UDP connection with the streaming decoder and starts to send content in accordance with an instruction from this protocol (1104). In accordance with such a procedure, the streaming content selected on the EPG by the user is played.

The streaming decoder and the streaming content are downloaded from a site provided by the digital television receiver manufacturer. Thus, the user can enjoy streaming content without being particularly aware of the type of file format or the type and version of the decoder.

In this embodiment, after receiving, analyzing, and displaying the EPG data for television broadcasts, the data for streaming broadcasts is received, analyzed, and displayed. However, both the processing may be performed in parallel.

Although the site for providing streaming content information is operated by a receiver manufacturer in this embodiment, a broadcast station or the like may operate such a site. Also, Web sites may be added and modified when setting up the EPG. If there is a difference between the formats of the streaming files depending on the provider sites, a corresponding decoder can be downloaded at the same time.

Although the streaming content information is retrieved after pressing an EPG key in this embodiment, the streaming content information can be automatically retrieved in the background while not operated by the user.

As described above, according to this embodiment, for a case where a function to receive streaming content is provided, an integrated EPG screen is displayed in which an EPG for streaming broadcasts is added to a normal EPG for television broadcasts. A desired program is selected from among the programs displayed in the EPG and the selected program is played and displayed. Thus, the user can easily select a desired program without being aware of the difference in media, such as television and streaming broadcasting.

Second Embodiment

The features of a download module in a second embodiment of the present invention are different from that in the first embodiment. The structure of a receiver according to the second embodiment is similar to that of the digital television receiver 100 in the first embodiment. Only points different from the first embodiment will be described below.

In this embodiment, a new search system not included in the known EPG is provided by downloading an additional SI module.

In this embodiment, a list of downloadable modules is obtained and displayed in the same manner as in the first embodiment. A user selects a new search condition from the module list shown in FIG. 7 and then selects a desired search system from a submenu using the remote control 116. Accordingly, a new SI module and search engine software are downloaded.

The CPU 118 acquires all the SI modules for media through which the modules can be received and displayed. For example, if data can be received through four types of media, such as terrestrial broadcasting, broadcasting satellite, communications satellite broadcasting, and streaming broadcasting, four SI modules corresponding to such media are acquired. Since the SI modules received here change over time (in response to changes in the broadcast programs), the EPG application periodically obtains the same corresponding modules in a similar manner. Thus, the latest modules are always held in the hard disc 121.

FIG. 12 shows person name information, which is an additional SI module downloaded in this embodiment. Referring to FIG. 12, media ID represents an ID indicating the type of media, that is, terrestrial broadcasting, broadcasting satellite, communications satellite broadcasting, or the like. Service ID and event ID represent a broadcasters name and a program name, respectively, as in those defined as EPG data. A person name descriptor functions as the core of person name information and describes the number of person names described therein and the entire size of the descriptor. The person name descriptor also describes a person name on a text basis. Downloading the person name information as an additional SI module is equal to obtaining this data for a display period (two weeks).

The user operates a predetermined key of the color keys 306 of the remote control 116 during the EPG display in order to search for a program. For a normal search function in which the additional SI module is not downloaded, the key operation by the user causes a normal search menu 1300 shown in FIG. 13A to be displayed. The user can select a desired search condition by moving a focus on the search menu 1300 using the cursor keys 305 of the remote control 116 and operating the set key 309. When using the normal function, however, only a category search 1301 can be performed.

Figure 13A:
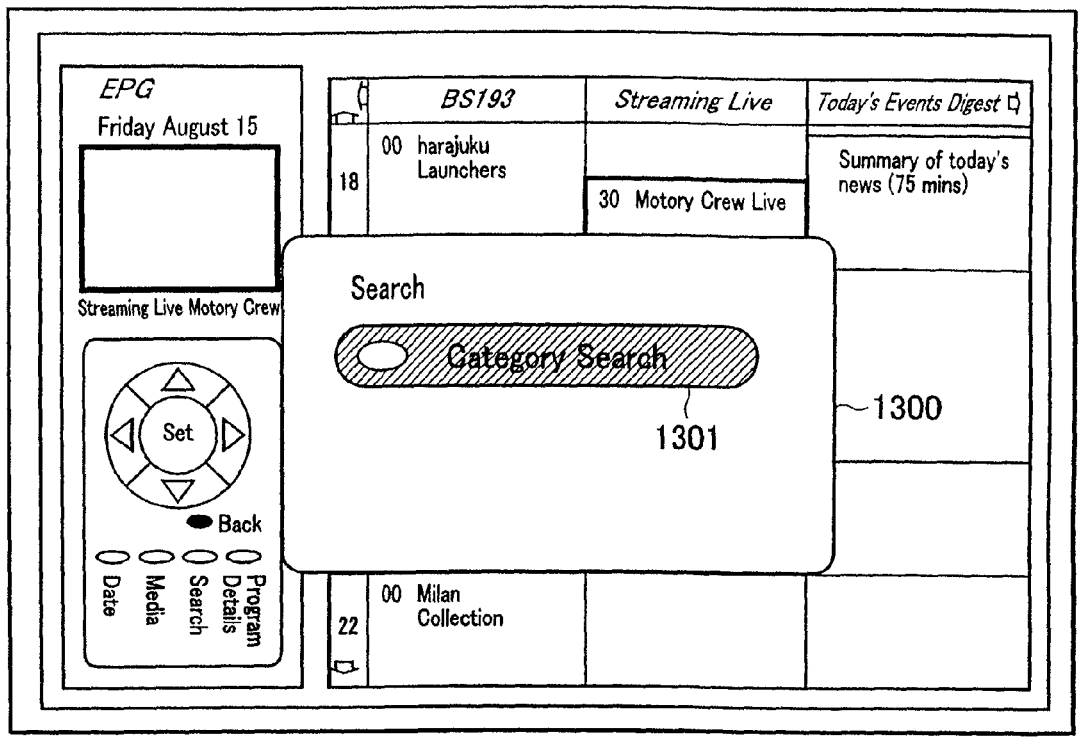
FIGS. 13A and 13B are illustrations for explaining search menus before and after downloading an additional module, respectively.
Figure 13B:
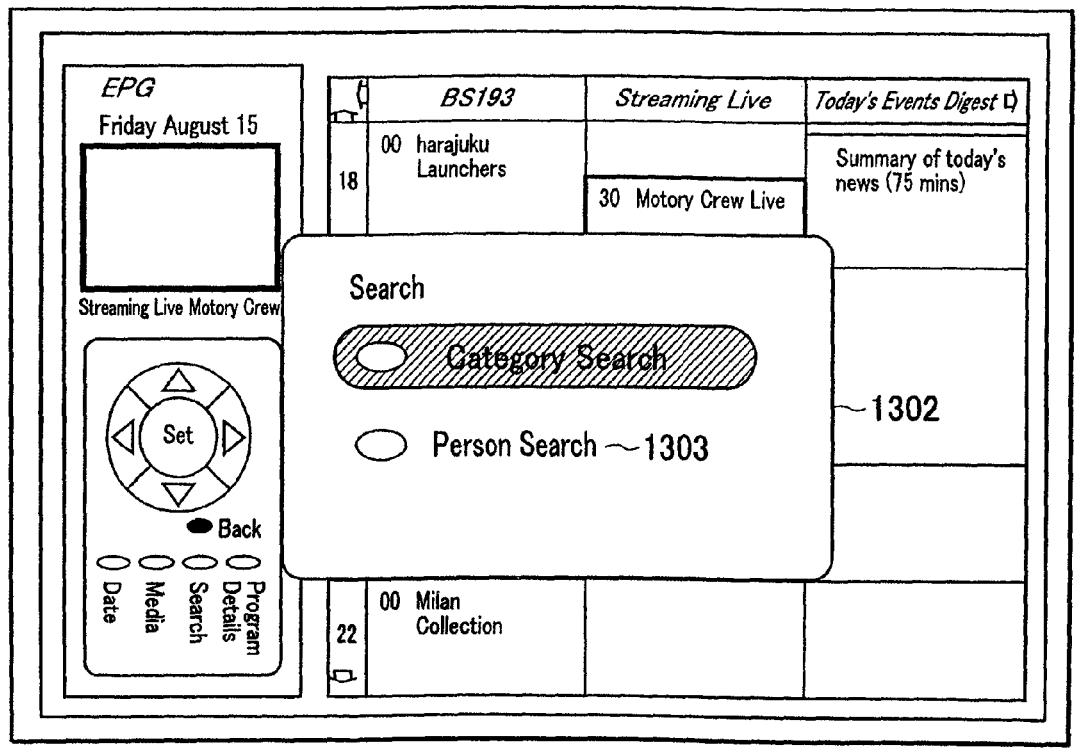

When downloading of the SI module and the search engine are completed, the EPG application displays a search menu 1302 shown in FIG. 13B, instead of the normal search menu 1300 shown in FIG. 13A, as a search menu display. More specifically, a person search 1303, which is a new search condition corresponding to the downloaded additional SI module, as well as the category search originally provided as a search condition, is displayed. The user can use such search functions by operating the cursor keys 305 and the set key 309 of the remote control 116.

Although the module for person searching and the search engine are downloaded as an additional SI module in this embodiment, other SI modules and search engines corresponding to a high-quality search, a text search, and the like may be downloaded.

As described above, in this embodiment, all the SI modules that are receivable through media are downloaded, and therefore, users can use the functions of the downloaded SI modules by performing predetermined operations during the display of the integrated EPG screen. Thus, the users can utilize various functions with easy operations.

Third Embodiment

A third embodiment of the present invention will now be described.

In this embodiment, a new reservation system not included in the known EPG is provided by downloading a multi-screen reservation function as an additional module.

FIG. 14 is a block diagram showing the structure of the digital television receiver 100 according to this embodiment. In FIG. 14, similar components as in FIG. 1 are referred to with the same reference numerals and the descriptions of those same components will not be repeated here.

Referring to FIG. 14, tuner units 101a and 101b perform processing on input signals, such as demodulation and error correction, and produce digital data in a format called a transport stream. The tuner units 101a and 101b output the TS data to the descrambler 102. As shown in FIG. 14, in this embodiment, the digital television receiver 100 includes two tuner units 101a and 101b, and thus each of the descrambler 102, the demultiplexer 103, the video decoder 104, the audio decoder 105, and the data stream processing unit 106 receives the TS data from the tuner units 101a and 101b and processes the received TS data.

Figure 15:
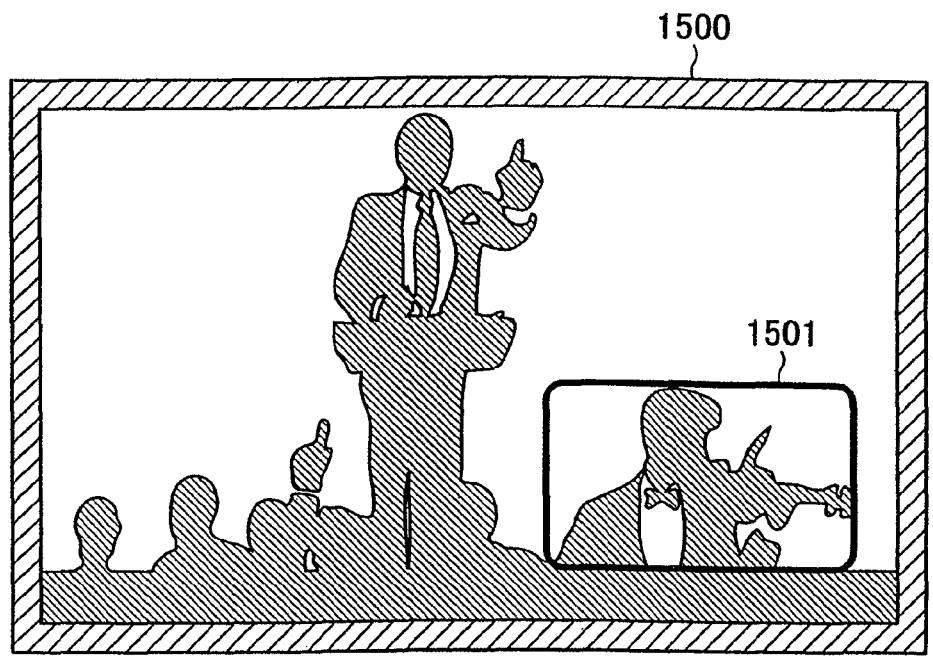
FIG. 15 shows an example of multi-screen display.

The display control unit 109 has an image composing function for displaying a plurality of images at the same time. Screen composition controlling software that is executed by the CPU 118 controls images from at most two pieces of TS data and displays the composite screen as a so-called multi-screen. FIG. 15 shows an example of multi-screen display. Referring to FIG. 15, a subscreen 1501 is displayed within a main screen 1500.

In this embodiment, a list of downloadable modules is obtained and displayed in the same manner as in the first embodiment. A user selects the multi-screen reservation from the module list shown in FIG. 7 using the remote control 116 and then selects the number of screens to be displayed from a submenu. Accordingly, new software for reservation control is downloaded.

Figure 16:
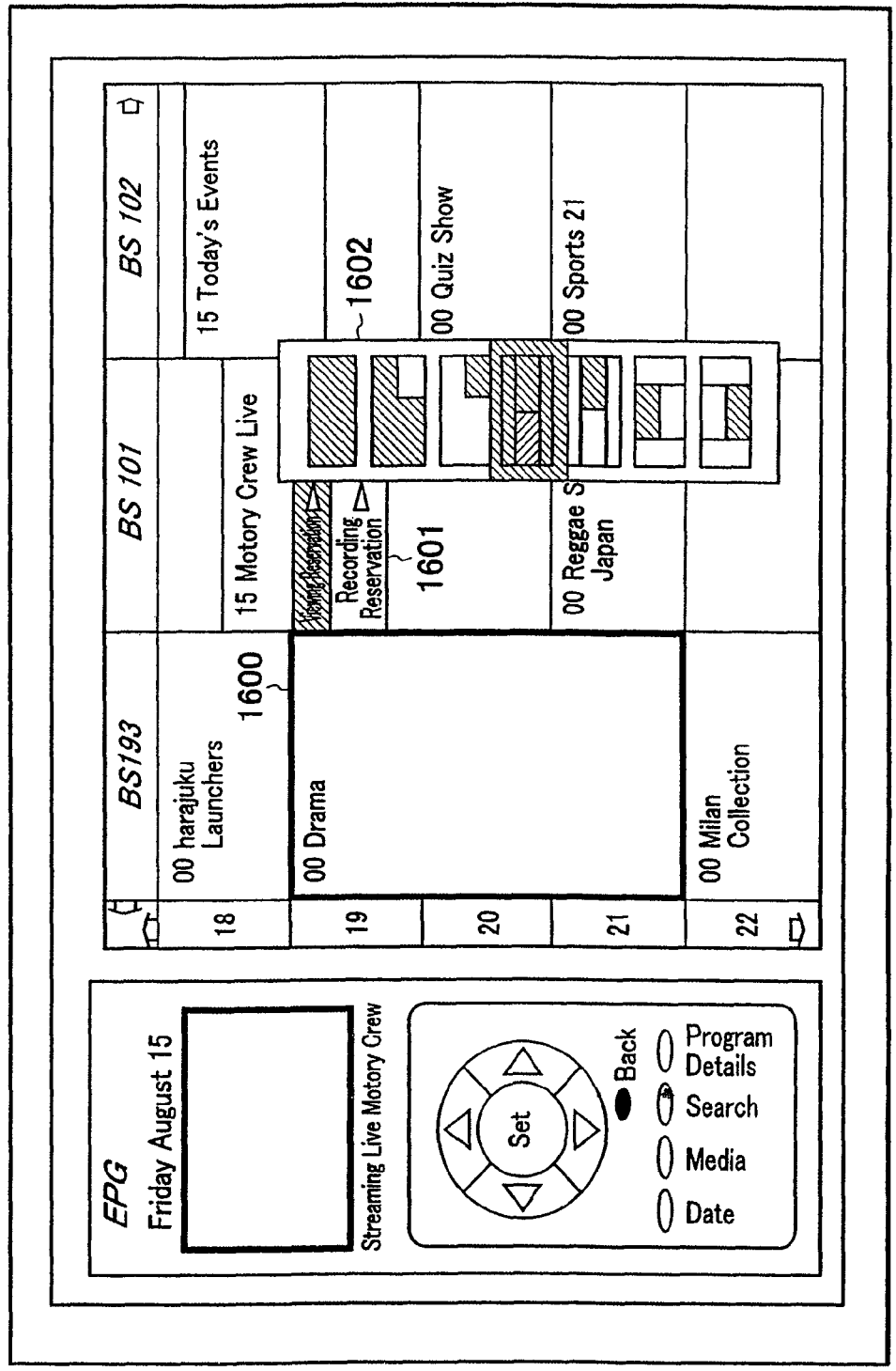
FIG. 16 is an illustration for explaining a reservation operation on an EPG display after a multi-screen reservation module is obtained.

FIG. 16 shows a state in which the multi-screen reservation is performed on the EPG display after obtaining the multi-screen reservation module.

The user selects a selection area 1600 for a reservation corresponding to a program for viewing or recording reservation using the cursor keys 305 of the remote control 116. After operating the set key 309, a reservation select menu 1601 for selecting viewing reservation or recording reservation is displayed as a pull-down menu. Then, after selecting a desired operation from the reservation select menu 1601 using the remote control 116, a configuration select menu 1602 for selecting the configuration of a multi-screen on which the corresponding program is displayed is also displayed as a pull-down menu. The user sets the desired display configuration using the cursor keys 305 of the remote control 116 to complete the multi-screen reservation.

Figure 17:
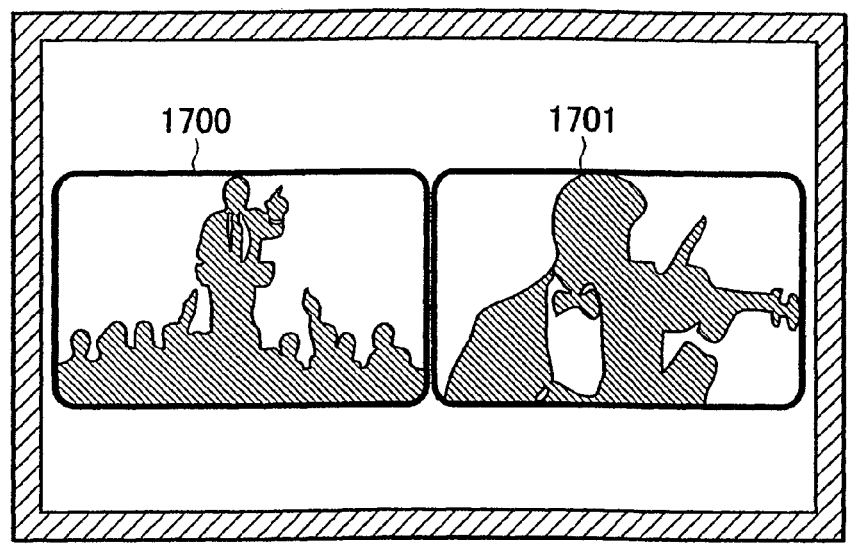
FIG. 17 is an illustration for explaining a display operation performed in accordance with the multi-screen reservation.

FIG. 17 shows a state when a display operation is performed in accordance with the multi-screen reservation. When a viewing reservation to display a reserved program on the left screen of two-screen display is made, two screens are displayed in such a manner that, at the broadcast time of the reserved program, the program that was being viewed is displayed in a right screen 1701 and the reserved program is displayed in a left screen 1700.

Other processing is performed in the same manner as in the embodiments described above.

As described above, in this embodiment, if a two-screen (multi-screen) display function is provided, a module for realizing a multi-screen reservation function is downloaded via a network. With predetermined operations on the EPG display, users can use the multi-screen reservation function by changing the display mode of the screen in accordance with the downloaded module. Thus, the users can use the new function with easy operations.

Although, in this embodiment, the digital television receiver 100 includes two tuner units 101a and 101b, three or more tuner units may be provided to compose a screen.

As described above, according to the present invention, a display mode of guide information is changed in accordance with information on an operation for receiving broadcast content. Thus, users can select a desired program using a guide screen appropriate for receiving broadcast content.

While the present invention has been described with reference to what are presently considered to be the preferred embodiments, it is to be understood that the invention is not limited to the disclosed embodiments. On the contrary, the invention is intended to cover various modifications and equivalent arrangements included within the spirit and scope of the appended claims. The scope of the following claims is to be accorded the broadest interpretation so as to encompass all such modifications and equivalent structures and functions.

What is claimed is:

1. A receiving apparatus comprising:
a first tuner unit and a second tuner unit, each of which is configured to receive program contents delivered with a television broadcast signal;
a display control unit configured to control display of video of the program contents by executing a first display mode in which either video of a program content received by the first tuner unit or video of a program content received by the second tuner unit is displayed on a screen, and a second display mode in which both video of the program content received by the first tuner unit and video of the program content received by the second tuner unit are displayed on a same screen; and
a reservation setting unit configured to set a viewing reservation for viewing video of a program content which is scheduled to be delivered with a television broadcast signal on a screen of an electronic program guide which is composed of a broadcast time axis and a channel axis, in response to a user operation, and configured to select and set, on the screen of the electronic program guide, a display mode of the program content from among the first display mode and the second display mode by a user operation when the user sets the viewing reservation for the video of the program content,
wherein the user is capable of selecting and setting a display position of the program content and a display layout from among a picture-in-picture display layout and a picture-out-picture display layout in the second display mode, when setting the viewing reservation for the video of the program content via the reservation setting unit, and
wherein the display control unit displays, by using pull-down menu, a display layout for the first display mode and a plurality of display layouts for the second display mode on the screen of the electronic program guide so that the user can make a selection from among the display layouts of the pull-down menu, and with a picture-in-picture display layout and a picture-out-picture display layout in the second display mode, the display control unit displays a region corresponding to the display position of the program content to be set for viewing reservation and other regions, in different colors.

2. The receiving apparatus according to claim 1, wherein in a case where the second display mode is selected and set when the reservation setting unit sets the viewing reservation, the display control unit switches, in accordance with a broadcast time of the program content reserved for viewing set by the reservation setting unit, from a state where the video of the program content received by the first tuner unit is displayed in the first display mode to a state where the video of the program content received by the first and second tuner units respectively are displayed in the second display mode; and
wherein the video of the program content being received by the second tuner unit is the program content reserved for viewing set by the reservation setting unit.

3. A receiving method for a receiving apparatus, comprising:
receiving, by a first tuner unit and a second tuner unit, program contents delivered with a television broadcast signal;
controlling display of video of the program contents by executing a first display mode in which either video of a program content received by the first tuner unit or video of a program content received by the second tuner unit is displayed on a screen, and a second display mode in which both video of the program content received by the first tuner unit and video of the program content received by the second tuner unit are displayed on a same screen; and
a reservation setting step of setting a viewing reservation for viewing video of a program content which is scheduled to be delivered with a television broadcast signal on a screen of an electronic program guide which is composed of a broadcast time axis and a channel axis, in response to a user operation, and
selecting and setting, on the screen of the electronic program guide, a display mode of the program content from among the first display mode and the second display mode by a user operation when the user sets the viewing reservation for the video of the program content,
wherein the user is capable of selecting and setting a display position of the program content and a display layout from among a picture-in-picture display layout and a picture-out-picture display layout in the second display mode, when setting the viewing reservation for the video of the program content in the reservation setting step, and
wherein the display controlling step displays, by using a pull-down menu, a display layout for the first display mode and a plurality of display layouts for the second display mode on the screen of the electronic program guide so that the user can make a selection from among the display layouts, and with a picture-in-picture display layout and a picture-out-picture display layout in the second display mode, the display controlling step displays a region corresponding to the display position of the program content to be set for viewing reservation and other regions, in different colors.

4. The method according to claim 3, wherein in a case where the second display mode is selected and set when the reservation setting step sets the viewing reservation, the display controlling step switches, in accordance with a broadcast time of the program content reserved for viewing set by the reservation setting step, from a state where the video of the program content received by the first tuner unit is displayed in the first display mode to a state where the video of the program content received by the first and second tuner units respectively are displayed in the second display mode; and
wherein the video of the program content being received by the second tuner unit is the program content reserved for viewing set by the reservation setting step.

* * * * *